(12) United States Patent
Cohen et al.

(10) Patent No.: US 9,477,780 B2
(45) Date of Patent: Oct. 25, 2016

(54) TARGET TREE GENERATION

(71) Applicant: Hewlett-Packard Development Company, L.P., Houston, TX (US)

(72) Inventors: Ben Cohen, Jerusalem (IL); Gil Tzadikevitch, Rishon Leziyon (IL); Hadas Avraham, Modiin (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 288 days.

(21) Appl. No.: 13/660,422

(22) Filed: Oct. 25, 2012

(65) Prior Publication Data
US 2014/0122534 A1  May 1, 2014

(51) Int. Cl.
*G06F 17/30* (2006.01)

(52) U.S. Cl.
CPC .............. *G06F 17/30961* (2013.01)

(58) Field of Classification Search
CPC ............. G06F 17/30563; G06F 17/30961
USPC ................................ 707/600–603
See application file for complete search history.

(56) References Cited

U.S. PATENT DOCUMENTS

| | | | |
|---|---|---|---|
| 7,519,606 B2 | 4/2009 | Hernandez-Sherrington et al. | |
| 8,214,372 B2 | 7/2012 | Gupta et al. | |
| 2004/0093342 A1 | 5/2004 | Arbo et al. | |
| 2007/0226085 A1 | 9/2007 | Roach et al. | |
| 2008/0222171 A1 | 9/2008 | Charters | |
| 2009/0144319 A1* | 6/2009 | Panwar et al. | 707/102 |
| 2010/0115100 A1* | 5/2010 | Tubman | G06F 17/30545 709/227 |
| 2010/0169860 A1* | 7/2010 | Biazetti | H04L 41/0806 717/107 |
| 2010/0191555 A1* | 7/2010 | Shmul | G06Q 10/06 717/104 |
| 2011/0307290 A1 | 12/2011 | Rolia et al. | |
| 2012/0030220 A1 | 2/2012 | Edwards et al. | |
| 2012/0079502 A1* | 3/2012 | Kwan et al. | 718/106 |
| 2012/0102075 A1 | 4/2012 | Breh et al. | |
| 2012/0233182 A1 | 9/2012 | Baudel et al. | |
| 2013/0006935 A1* | 1/2013 | Grisby | 707/635 |
| 2014/0019597 A1* | 1/2014 | Nath et al. | 709/220 |

OTHER PUBLICATIONS

Cowan, B.A., "A Tree-to-tree Model for Statistical Machine Translation," Retrieved from http://people.csail.mit.edu/brooke/web/papers/phd.pdf, May 23, 2008, 234 pages, Cambridge, MA, USA.
Unknown., "Mapping Data with XML Data Configuration Files," Retrieved from http://publib.boulder.ibm.com/infocenter/rentrpt/v1r0m1/index.jsp?topic=%2Fcom.ibm.rational.raer.help.doc%2Ftopics%2Ft_xdccontainer.html, Oct. 2012, 1 page.

* cited by examiner

*Primary Examiner* — Etienne Leroux
*Assistant Examiner* — Cindy Nguyen
(74) *Attorney, Agent, or Firm* — Brooks, Cameron & Huebsch, PLLC

(57) ABSTRACT

Target tree generation can include constructing a mapping file comprising a definition of a target tree and generating the target tree using source data and the mapping file.

18 Claims, 3 Drawing Sheets

TARGET TREE GENERATION

BACKGROUND

A configuration management database (CMDB) can be a repository of information relating to components of an information system (e.g., combination of information technology devices and computing devices, etc.). The CMDB can include a plurality of configuration items (CI) (e.g., requirement documents, software, models, plans, etc.). The CMDB can store records (e.g., metadata, data, etc.) that include relationships between the plurality of CIs.

DETAILED DESCRIPTION

Configuration management databases (CMDBs) can include a plurality of configuration items (CI) that can be organized as nodes in a CMDB data tree. For example, each CI can be represented by a node in the CMDB data tree. The CMDB data tree can show a relationship between connected CIs. For example, the CMDB data tree can show how the CIs are interconnected and/or how the CIs are dependent on other CIs. The data represented in the CMDB data tree can be used to generate a target data tree (e.g., a data tree in a format different from the CMDB data tree, etc.). For example, data relating to each CI can be input into a mapping file to generate a data tree with definitions of a target system. The target data tree that is generated can be utilized by the target system.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

As used herein, "a" or "a number of" something can refer to one or more such things. For example, "a number of nodes" can refer to one or more nodes.

Figure 1:
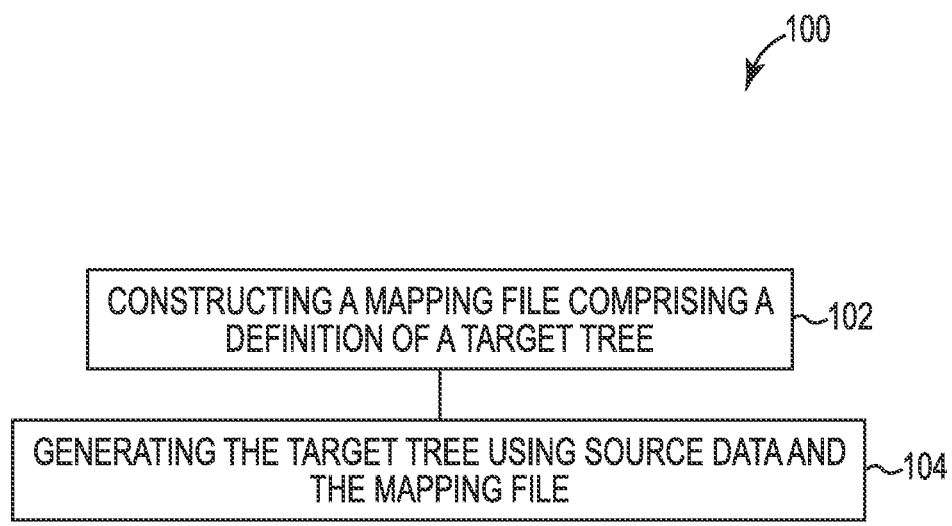
FIG. 1 illustrates a flow chart of an example method for target tree generation according to the present disclosure.

FIG. 1 illustrates flow chart of an example method 100 for target tree generation according to the present disclosure. Method 100 can be used to convert source data from a first data tree and generate a second data tree that can be used by a second device. For example, the source data can be data from a CMDB (e.g., universal configuration management database, etc.) that can be converted to a target data tree.

At 102, a mapping file comprising a definition of a target tree is constructed. Constructing a mapping file can include executing instructions stored in memory to create definitions associated with one or more target trees that can be used with a particular target system. The target system can include, for example, a set of hardware, software and/or firmware to be used in a particular organization, business and/or other environment.

The definition can include a tree structure with a number of attributes and/or variables that can be utilized by the target system. For example, the definition of the target tree can include: a definition of the structure of the target tree, a number of attributes for each node within the target tree, and/or a number of variables for each node within the target tree.

The definition can include a structure type of the target tree. The structure type of the target tree can be various types of data tree structures. For example the target tree structure can be a rooted tree structure (e.g., tree with a root node, all nodes within the tree dependent on a single root node, etc.).

The structure type of the target tree can include the type of tree structure as well as specific features of the type of tree structure. For example, the specific features of the type of tree structure of the target tree can include a root node with two child nodes wherein each of the two child nodes also has a child node.

The definition can include a number of attributes (e.g., characteristics, qualities, etc.) for each node within the target tree. The number of attributes can include a name of the node (e.g., target CI type name, etc.). The name of the node can be used to identify each node within the target tree. For example, the attributes of the root node can be a description of a CI (e.g., computing device, software program, etc.). In this example, the attributes of the child nodes can be a number of features of the CI. The number of child nodes can be a number of features of the parent nodes. For example, if the parent node is a CI, then the child nodes can include features such as, serial number of the CI, model of the CI, brand of the CI, nature of the CI, bar code of the CI, among other features.

The number of attributes can also include a data type (e.g., string, etc.). The data type can describe a particular type of data that can be utilized for a particular node in the target tree. For example, the root node can include a data type of string data. In this example, data from the source tree that is in the data type of string data can be retrieved from the source tree that relates to one of the number of attributes and/or variables of the root node.

The definition can also include a number of variables. The number of variables can be utilized to determine a value for each node based on the source tree. The number of variables can be unknown values that are retrieved from the source data and/or source tree. For example, the variable for a particular node can include a number (e.g., serial number, etc.). The variable can be used to determine a value of the target tree node from data of the source tree. In the previous example, the value can be the serial number of the product represented by the root node of the target tree that is retrieved from the source data and/or the source tree.

The definition can include a data link from the source data to each of the nodes of the target tree. For example, the data link can sync data from the source data to a particular node of the target tree based on the definition. The data link can enable access from the target tree to corresponding source data from the source tree. The data link can also enable access to corresponding parent nodes and corresponding child nodes of the source tree.

At 104, the target tree is generated using source data and the mapping file. Generating a target tree using source data and the mapping file can include executing instructions stored in memory to generate a target tree based on the definitions included in the mapping file. The source data can be organized in a source tree (e.g., source data tree, etc.). For example, the source data can be in a first data tree that is different than the target data tree.

The source tree can comprise source data at each of a number of nodes within the source tree. For example, the source tree can include a root node that represents a CI and/or node within an IT system. In this example, the root node can have two child nodes. A first child node can represent an internet protocol (IP) address and a second child node can represent a hardware board. Each node (e.g., root node, child node, etc.) can include a portion of the source data that relates to the corresponding node. For example, the root node can include source data relating to the CI. In this example, a first child node can include source data relating to an IP address and the second node can include source data relating to a hardware board of the CI.

Constructing the mapping file comprising the definition of the target tree can include executing instructions stored in memory to construct a number of extraction rules to extract source data based on the attributes and variables for each of the nodes within the target tree. For example, it can be determined that a child node of a root node CI with an attribute of "AmModel-Parent" and variables of a string data type barcode can include source data of a barcode for the root node device. In this example, the mapping file can include definition instructions (e.g., modules, etc.) that define the structure of the target tree along with attributes and variables for each node within the structure of the target tree. The extraction rules can define a method of extraction within the mapping file. For example, the extraction rules can be used to extract metadata from a CMDB (e.g., UCMDB, etc.).

Constructing a mapping file can enable a user to extract data from source data (e.g., UCMDB, etc.) and organize portions of the source data into the target tree based on the definition of the target tree. The definition of the target tree can be determined based on a function of a target system. For example, the target system can utilize data that is in a particular structure and/or includes particular attributes and values at particular nodes within the particular structure. In this example, the mapping file can be constructed with a definition that matches and/or accounts for a function of the particular structure and/or attributes and values.

By constructing a mapping file with a definition of the target tree, a plurality of source data each comprising a variety of data tree structures can be used to generate a corresponding target tree (e.g., target tree that represents the source data, etc.).

Figure 2:
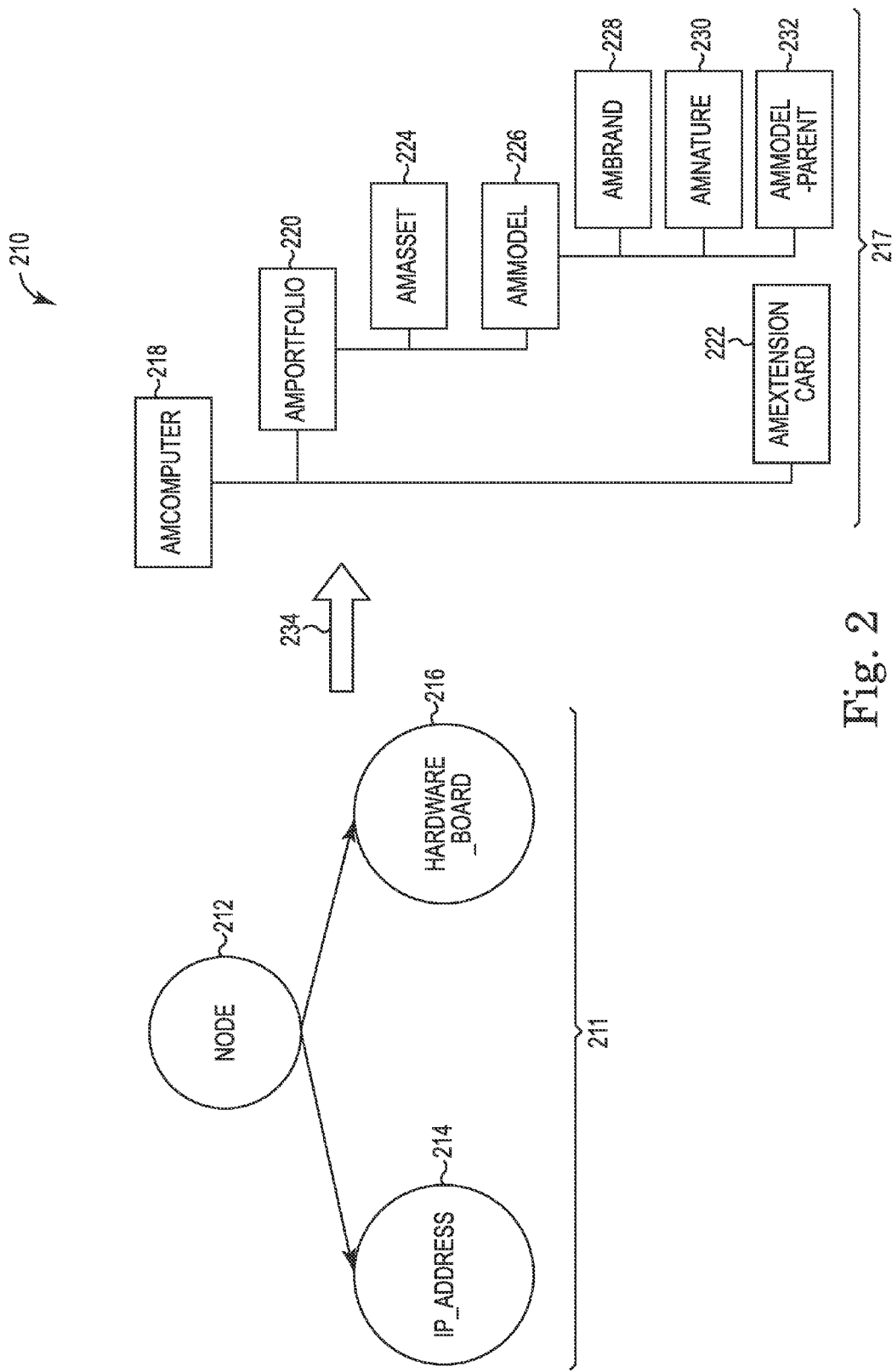
FIG. 2 illustrates a diagram for an example target tree generation according to the present disclosure.

FIG. 2 illustrates a diagram 210 an example target tree generation according to the present disclosure. Diagram 210 includes a source tree 211 that comprises source data (e.g., IP address, hardware board, information relating to a CI, etc.). The source tree 211 can include source data from a CMDB. The source data can be organized in a variety tree structures.

The source tree 211 can include a root node 212. The root node 212 can be a designated node from a portion of a larger set of data. For example, the root node 212 can represent a particular CI within a CMDB that comprises a plurality of CIs. The root node 212 can have child nodes (e.g., child node 214, child node 216, etc.). Each child node can include source data relating to the root node 212. For example, child node 214 can be IP address data relating to the root node 212. In another example, child node 216 can be hardware board data relating to the root node 212.

The source tree 211 can be represented in a variety of structures and the structure of a root node 212 connected to an IP address node 214 and a hardware board node 216 should not be taken in a limiting sense. The source tree 211 can have a number of additional child nodes connected to the root node 212 and a number of additional child nodes (not shown) connected to the child nodes (e.g., child node 214, child node 216, etc.).

Arrow 234 can represent generating the target tree 217. At arrow 234, a mapping file can be used to generate the target tree 217. The mapping file can include a definition of the target tree 217. The definition of the target tree 217 can include a structure type, attributes, and/or variables that relate to the target tree 217. For example, the structure type can include information including that node 218 is a root node (e.g., AmComputer, etc.), node 220 (e.g., AmPortfolio, etc.) and node 222 (e.g., AmExtension, etc.) are child nodes of the root node 218. In another example, node 224 (e.g., AmAsset, etc.) and node 226 (e.g., AmModel, etc.) are children of node 220. Furthermore, in another example, node 228 (e.g., AmBrand, etc.), node 230 (e.g., AmNature, etc.), and node 232 (e.g., AmModel-Parent, etc.) can be child nodes of node 226.

The mapping file can also include a definition for attributes of the target tree 217. Attributes can be information that can be included within a particular node of the target tree 217. For example, the root node 218 can have various attributes such as a root IP address, a title (e.g., AmComputer, etc.), among other attributes that can be defined in the mapping file. The attributes can be defined in the mapping file and extracted from the source tree 211. For example, the root IP address can be an attribute of the amComputer root node 218. In this example, the mapping file can extract attribute information (e.g., IP address, etc.) and transfer the extracted attribute information to the amComputer root node 218 of the target tree 217.

The mapping file can also include a definition for variables of the target tree 217. Variables can include an operationalized way that the attributes are represented for data processing. For example, the variables can include a data type (e.g., string data, etc.) The variables of the attributes can be extracted from the source tree 211 to the target tree 217. For example, the root IP address can be the attribute of node 214 and extracted from the source tree 211 and transferred to the AmComputer root node 218 of the target tree as string data. That is, the mapping file can include a definition of each attribute of the target tree 217 with a variable definition to define the operationalized way each attribute is represented within the target tree 217.

The variables can be represented as a value in a corresponding node of the target tree 217 based on the extracted data from the source tree 211. For example, if the attributes for AmAsset node 224 is a particular serial number, and the variable of the attributes for AmAsset is string data, then the value can be represented as extracted string data of the particular serial number. The extracted string data from the source tree 211 can be included in the generated target tree 217 at the AmAsset node 224.

An example mapping file can include Example 1 below:

```
<target_ci_type name="amComputer">
    <variable name="vComputerName" datatype="STRING" value="Root[
'name']"/>
```

```
    <target_ mapping name="TcpipAddress" datatype="STRING"
value="AMPushFunctions.getipAddress (Root.ip _address*. getAt ('name')) "/>
    <target_mapping name=" TcpipHostName" datatype="STRING"
value="vComputerName"/>
        <target_ci_type name="amPortfolio">
            <target mapping name="CMBId" datatype="STRING"
value="globalId"/>
                <target_ci_type name="amAsset">
                    <tarqet_mapping name="SerialNo" datatype="STRING"
value="vSerialNo"/>
                </target_ci_type>
                <target_ ci type name="amModel ">
                    <target_mapping name="Name" datatype="STRING" Ignore-
on-null="false" value="Root[ 'node_model')"/>
                    <target_ci_type name="amBrand">
                        <target_mapping name="Name" datatype="STRI NG"
value="AMPushPunctions.getBrandName(Root 'vendor' ], Root[
'discovered_vendor ')" />
                    </target_ci_type>
                    <target ci_type name="amNature">
                        <target_mapping name="Code" datatype="STRING"
value="AMPushFunctions.getNatureCode(i IsComputerAVM)"/>
                    </target_ci_type>
                    < tarqet _ci type name='amModel-Parent">
                        <target_mapping name="BarCode" data type
="STRING" value= "Root['node_role']"/>
                    </target_ci_type>
                </target_ci_type>
        </target_ci_type>
<for-each source-ci count-index="i" source-cis= "Root.Hardware Board">
    <target_ci_type name="amExtensionCard">
        <target_mapping name="CardiD" datatype="STRING"
value="Root.Hardware_Board[i] ['vendor_card_id']"/>
        <target mapping name="Name" datatype="STRING"
value="AMPushFunctions.getCardName (Root.Hardware_Board[i] ['name']) "/>
            < target _ci_type name="amVendor" >
                <target mapping name="Name" datatype ="STRING"
value="AMPushFunctions.getCardVendorName(Root.Hardware_Board[i]
['vendor'])"/>
            </target_ci_type>
        </target ci type>
</for-each-source-ci>
```

Example 1

Example 1 can represent an example mapping file that can generate the target tree 217 based on extracted source data from the source tree 211. Example 1 provides an example of how the mapping file can extract attributes and variables in the form of a value based on the source tree 211.

The mapping file in Example 1 can extract a particular attribute of the root element (e.g., Root['attr']) of the source tree 211 (e.g., root node 212, etc.). For example, value="root ['name']" can be used to extract the name of the root element AmComputer from the source tree 211 and return the name to the target tree 217 at root node 218.

The mapping file in Example 1 can execute to extract a topology query language (TQL) result list of the CI instances named in a particular query element linked to the root node 212 (e.g., Root.Query_Element_Name). For example, root.query_element_name[2]['attr'] can return a value of the attribute named 'attr' of the $3^{rd}$ CI in the TQL result named 'Query_Element_Name' that is linked to the current root CI (e.g., root node 212, etc.).

The mapping file in Example 1 can execute to extract a list of attributes of the CIs instances named in the TQL result list and can be linked to the current root node 218. For example, root.query_element_name*.getat('attr') can return the list of attributes of the defined 'attr' of the linked CIs to the root CI (e.g., root node 218, etc.) which returned in the TQL result as 'query_element_name' (e.g., root node 218, etc.).

The mapping file in Example 1 can execute to use the root node (e.g., root node 218) as a starting point that enables access to other elements in the source tree 211. That is, the mapping file can use a traveling technique over the root node. In one example, the traveling technique can include a groovy traveler (e.g., a traveler that utilizes "groovy" technique, etc.).

In the mapping file in Example 1 can execute to the source data from the source tree 211 can be searched by the source data's relationship to the root node 212. The mapping file in Example 1 can be modified to include any number of attributes and variables to generate a target tree that comprises a particular structure with particular values at each node within the particular structure. That is, the source tree 211 can be used to generate a variety of different target trees (e.g., target tree 217, etc.).

By constructing a mapping file with the definition of a target tree a variety of source trees can be used to generate a variety of target trees. For example, if the structure, attributes, variables, and values as described herein are known for a particular target tree, the mapping file can be constructed as described herein to generate the particular target tree. In another example, CMDB (e.g., universal configuration management database (UCMDB), etc.) data models can be used to generate a variety of other data models which can enable integration between transferring UCMDB data and a variety of other products (e.g., devices, programs, etc.).

Figure 3:
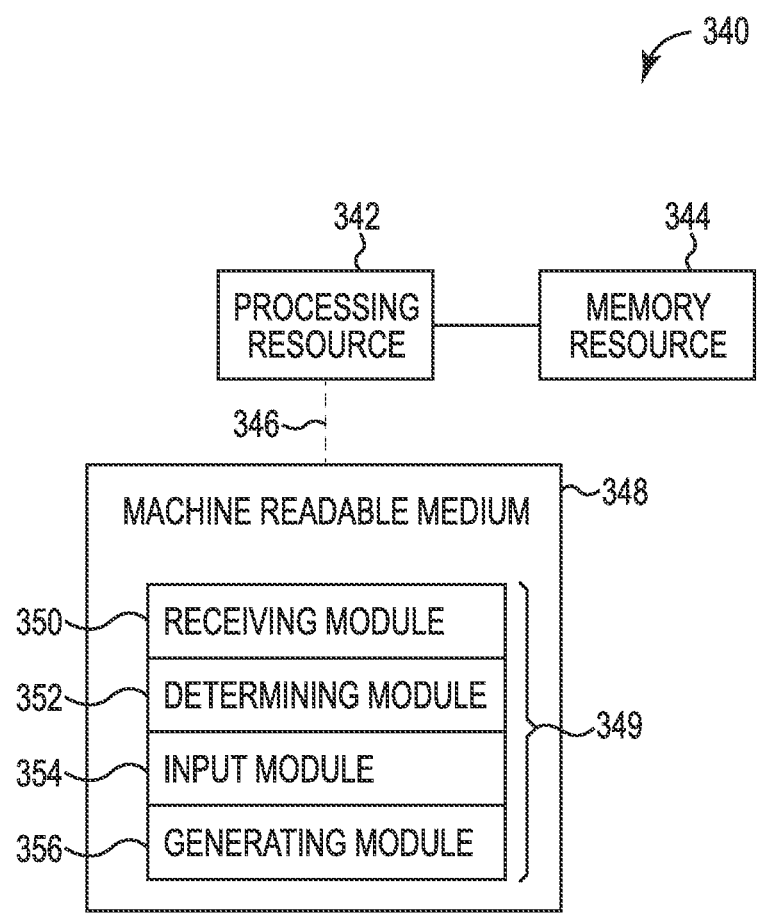
FIG. 3 illustrates a diagram of an example computing device according to the present disclosure.

FIG. 3 illustrates a diagram of an example computing device 340 according to the present disclosure. The computing device 340 can utilize software, hardware, firmware, and/or logic to provide a simulated network including a number of network parameters.

The computing device 340 can be any combination of hardware and program instructions configured to target tree generation. The hardware, for example can include one or more processing resources 342, machine readable medium (MRM) 348 (e.g., computer readable medium (CRM), database, etc.). The program instructions (e.g., computer-readable instructions (CRI) 349) can include instructions stored on the MRM 348 and executable by the processing resources 342 to implement a desired function (e.g., receive a source tree, determine a mapping file for a target tree, input extensible markup language data of the source tree into the mapping file, generate the target tree, etc.).

MRM 348 can be in communication with a number of processing resources of more or fewer than processing resources 342. The processing resources 342 can be in communication with a tangible non-transitory MRM 348 storing a set of CRI 349 executable by the processing resources 342, as described herein. The CRI 349 can also be stored in remote memory managed by a server and represent an installation package that can be downloaded, installed, and executed. The computing device 340 can include memory resources 344, and the processing resources 342 can be coupled to the memory resources 342.

Processing resources 342 can execute CRI 349 that can be stored on an internal or external non-transitory MRM 348. The processing resources 342 can execute CRI 349 to perform various functions, including the functions described in FIG. 1 and FIG. 2. For example, the processing resources 342 can execute CRI 349 to generate the target tree using source data and the mapping file.

The CRI 349 can include a number of modules 350, 352, 354, 356. The number of modules 350, 352, 354, 356 can include CRI that when executed by the processing resources 342 can perform a number of functions.

The number of modules 350, 352, 354, 356 can be sub-modules of other modules. For example, the input module 354 and the generating module 356 can be sub-modules and/or contained within the same computing device (e.g., computing device 340). In another example, the number of modules 350, 352, 354, 356 can comprise individual modules on separate and distinct computing devices.

A receiving module 350 can include CRI that when executed by the processing resources 342 can perform a number of receiving functions. The receiving module 350 can execute instructions to receive a source tree that includes source data. For example, instructions associated with the receiving module 350 can be executed to receive a UCMDB data tree can be received by the receiving module and use the UCMDB data as a source tree.

A determining module 352 can include CRI that when executed by the processing resources 342 can perform a number of determination functions. The determining module 352 can determine a mapping file for a target tree that includes a definition of the target tree. For example, instructions associated with the determining module 352 can be executed to determine a target tree to generate from the received source tree. The determining module can determine a particular target tree and construct a mapping file that includes a definition of the particular target tree.

An input module 354 can include CRI that when executed by the processing resources 342 can perform a number of inputting functions. The input module 354 can be executed to input extensible markup language (xml) data of the source tree data into the constructed mapping file to generate the target tree. The input module 354 can be executed to use the received source tree and use the source data of the source tree as an input for the mapping file.

A generating module 356 can include CRI that when executed by the processing resources 342 can perform a number of generating target tree functions. The generating module 356 can be executed to use the definitions of the mapping file and the inputted source data to generate a target tree that comprises the defined attributes and variables of the mapping file along with the resulting values extracted from the source tree. For example, instructions associated with the mapping module 350 can be executed to include a definition of attributes and variables for each node of a target tree. Data can be inputted to the mapping file from the source tree, and based on the attributes and variables, values can be determined for each node that fulfills the defined attributes and variables and generates a target tree that is defined by the mapping file.

A non-transitory MRM 348, as used herein, can include volatile and/or non-volatile memory. Volatile memory can include memory that depends upon power to store information, such as various types of dynamic random access memory (DRAM), among others. Non-volatile memory can include memory that does not depend upon power to store information.

The non-transitory MRM 348 can be integral, or communicatively coupled, to a computing device, in a wired and/or a wireless manner. For example, the non-transitory MRM 348 can be an internal memory, a portable memory, a portable disk, or a memory associated with another computing resource (e.g., enabling CRIs to be transferred and/or executed across a network such as the Internet).

The MRM 348 can be in communication with the processing resources 342 via a communication path 346. The communication path 346 can be local or remote to a machine (e.g., a computer) associated with the processing resources 342. Examples of a local communication path 346 can include an electronic bus internal to a machine (e.g., a computer) where the MRM 348 is one of volatile, non-volatile, fixed, and/or removable storage medium in communication with the processing resources 342 via the electronic bus.

The communication path 346 can be such that the MRM 348 is remote from the processing resources (e.g., 342), such as in a network connection between the MRM 348 and the processing resources (e.g., 342). That is, the communication path 346 can be a network connection. Examples of such a network connection can include a local area network (LAN), wide area network (WAN), personal area network (PAN), and the Internet, among others. In such examples, the MRM 348 can be associated with a first computing device and the processing resources 342 can be associated with a second computing device (e.g., a Java® server). For example, a processing resource 342 can be in communication with a MRM 348, wherein the MRM 348 includes a set of instructions and wherein the processing resource 342 is designed to carry out the set of instructions.

The processing resources 342 coupled to the memory resources 344 can execute CRI 349 to receive a source tree comprising configuration management database (CMDB) data. The processing resources 342 coupled to the memory resources 344 can also execute CRI 349 to determine a mapping file for a target tree that comprises a definition of the target tree. The processing resources 342 coupled to the memory resources 344 can also execute CRI 349 to input extensible markup language (xml) data of the source tree into the mapping file. Furthermore, the processing resources 342 coupled to the memory resources 344 can execute CRI 349 to generate the target tree based on the mapping file and the xml data of the source tree.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method for target tree generation, comprising:
   utilizing a processor to execute instructions located on a non-transitory medium for:
      receiving a source tree including source data;
      constructing a mapping file comprising a definition of a target tree, wherein the definition includes a structure of the target tree, the structure of the target tree is a rooted tree structure, and wherein the mapping file includes at least one variable for each of a plurality of nodes of the target tree; and
      generating the target tree using source data and the mapping file utilizing a traveling technique with a root node of the source tree as a starting point to access other nodes in the source tree, including:
         extracting a topology query language (TQL) result list of configuration item (CI) instances linked to the root node of the source tree; and
         extracting a list of attributes of the CI instances extracted from the TQL result list.

2. The method of claim 1, wherein generating the target tree includes inserting a number of variables from the source data into each node of the target tree.

3. The method of claim 1, wherein generating the target tree includes inserting a number of attributes from the source data into each node of the target tree.

4. The method of claim 1, comprising creating a data link from the source data to sync with each node of the target tree.

5. The method of claim 4, wherein creating the data link from the source data is based on the definition of the mapping file.

6. The method of claim 5, comprising accessing a corresponding parent node and a corresponding child node via the data link.

7. The method of claim 1, wherein the at least one variable has an unknown value.

8. The method of claim 7, comprising retrieving a value for the at least one variable from the source data.

9. The method of claim 1, wherein constructing the mapping file comprising the definition of the target tree includes:
   defining each of a plurality of attributes of the target tree;
   determining a definition of the at least one variable corresponding to at least one of the plurality of attributes; and
   determining how each of the plurality of attributes is represented within the target tree.

10. The method of claim 1, wherein the at least one variable includes string type data.

11. A non-transitory machine-readable medium storing a set of instructions executable by a processor to cause a computer to:
   receive a mapping file comprising a definition for a target tree, wherein the mapping file includes at least one variable for each of a plurality of nodes of the target tree, and wherein the definition includes a structure of the target tree, the structure of the target tree is a rooted tree structure;
   access source data of a source tree into the mapping file, wherein the source data includes configuration item (CI) instances of a configuration management database (CMDB); and
   generate the target tree using the mapping file and the source data utilizing a traveling technique with a root node of the source tree as a starting point to access other nodes in the source tree, including:
      extracting a topology query language (TQL) result list of the CI instances named in a particular query element linked to the root node of the source tree; and
      extracting a list of attributes of the CI instances extracted from the TQL result list.

12. The medium of claim 11, wherein the target tree includes a number of nodes that each includes a portion of the source data.

13. The medium of claim 12, wherein the portion of the source data corresponds to a particular node of the number of nodes within the target tree.

14. The medium of claim 12, wherein each of the number of nodes includes a link to a corresponding parent node and a corresponding child node.

15. A system for target tree generation, the system comprising a processing resource in communication with a non-transitory machine readable medium, wherein the non-transitory machine readable medium includes a set of instructions and wherein the processing resource is designed to carry out the set of instructions to:
   receive a source tree comprising configuration management database (CMDB) data;
   determine a mapping file for a target tree that comprises a definition of the target tree, wherein the mapping file includes at least one variable for each of a plurality of nodes of the target tree, and wherein the definition includes a structure of the target tree, the structure is a rooted tree structure; and
   generate the target tree using the mapping file and the source tree utilizing a traveling technique with a root node of the source tree as a starting point to access other nodes in the source tree, including:
      extracting a topology query language (TQL) result list of configuration item (CI) instances linked to the root node of the source tree; and
      extracting a list of attributes of the CI instances extracted from the TQL result list.

16. The computing system of claim 15, wherein the target tree can access the CMDB data via a link at each of a number of nodes within the target tree.

17. The computing system of claim 15, wherein the definition of the target tree includes a number of attributes and a number of variables that are particular to a target system.

18. The computing system of claim 15, wherein the definition includes extraction rules to extract metadata from the CMDB data.

\* \* \* \* \*